United States Patent
Golwalkar et al.

(10) Patent No.: US 8,326,846 B2
(45) Date of Patent: *Dec. 4, 2012

(54) VIRTUAL LIST VIEW SUPPORT IN A DISTRIBUTED DIRECTORY

(75) Inventors: Yogesh V. Golwalkar, Pune (IN); Kristin M. Hazlewood, Austin, TX (US); Rajalakshmi S. Iyer, Pune (IN); Magesh Rajamani, Pune (IN)

(73) Assignee: International Business Machines Corporation, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/004,463

(22) Filed: Jan. 11, 2011

(65) Prior Publication Data

US 2011/0106822 A1    May 5, 2011

Related U.S. Application Data

(63) Continuation of application No. 12/198,991, filed on Aug. 27, 2008, now Pat. No. 7,904,464.

(51) Int. Cl.
*G06F 17/30* (2006.01)
(52) U.S. Cl. ........................................ 707/752
(58) Field of Classification Search ......... 707/705–726, 707/752–765
See application file for complete search history.

(56) References Cited

U.S. PATENT DOCUMENTS

| | | |
|---|---|---|
| 4,510,567 A | 4/1985 | Chang et al. |
| 5,089,985 A | 2/1992 | Chang et al. |
| 5,666,534 A | 9/1997 | Gilbert et al. |
| 5,809,497 A | 9/1998 | Freund et al. |
| 6,119,079 A | 9/2000 | Wang et al. |
| 6,490,619 B1 | 12/2002 | Byrne et al. |
| 6,745,192 B1 | 6/2004 | Libenzi |
| 6,970,883 B2 | 11/2005 | Ku et al. |
| 7,127,416 B1 | 10/2006 | Tenorio |
| 7,130,885 B2 | 10/2006 | Chandra et al. |
| 7,286,840 B2 | 10/2007 | Jain |
| 7,315,613 B2 | 1/2008 | Kleindienst et al. |
| 7,451,403 B1 | 11/2008 | Srinivasan et al. |
| 7,512,620 B2 | 3/2009 | Dingle |
| 7,706,895 B2 | 4/2010 | Callaghan |
| 7,725,816 B2 | 5/2010 | Cottrille et al. |
| 7,904,464 B2 * | 3/2011 | Golwalkar et al. ........... 707/752 |
| 7,912,878 B2 | 3/2011 | Hazlewood et al. |

(Continued)

FOREIGN PATENT DOCUMENTS

WO    2006011641 A1    2/2006

OTHER PUBLICATIONS

USPTO final office action for U.S. Appl. No. 12/047,528, dated Jan. 25, 2011.

(Continued)

*Primary Examiner* — Wilson Lee
(74) *Attorney, Agent, or Firm* — Yee & Associates, P.C.; Jeffrey S. LaBaw

(57) ABSTRACT

A computer implemented method, data processing system, and computer program product for performing a virtual list view search in a distributed directory environment using a proxy server. The mechanism described in the illustrative embodiments enables a proxy server to provide virtual list view search support in a distributed directory environment when data is partitioned across multiple directory servers.

20 Claims, 6 Drawing Sheets

U.S. PATENT DOCUMENTS

| | | | |
|---|---|---|---|
| 7,937,360 B2 | 5/2011 | Hazlewood et al. | |
| 8,055,665 B2 | 11/2011 | Golwalkar et al. | |
| 8,099,405 B2 | 1/2012 | Vayssiere | |
| 2002/0120697 A1 | 8/2002 | Generous et al. | |
| 2003/0096600 A1 | 5/2003 | Lewis et al. | |
| 2004/0019487 A1 | 1/2004 | Kleindienst et al. | |
| 2004/0102957 A1 | 5/2004 | Levin | |
| 2005/0249172 A1 | 11/2005 | Malik | |
| 2006/0143160 A1 | 6/2006 | Vayssiere | |
| 2006/0209868 A1 | 9/2006 | Callaghan | |
| 2006/0276208 A1 | 12/2006 | Jain | |
| 2007/0043750 A1 | 2/2007 | Dingle | |
| 2007/0044011 A1* | 2/2007 | Cottrille et al. | 715/511 |
| 2007/0106630 A1* | 5/2007 | Fitzgerald et al. | 707/1 |
| 2008/0104094 A1* | 5/2008 | Cowham et al. | 707/101 |
| 2008/0140963 A1* | 6/2008 | Thomason et al. | 711/162 |
| 2009/0193013 A1* | 7/2009 | Hazlewood et al. | 707/5 |
| 2009/0216779 A1* | 8/2009 | Hazlewood et al. | 707/100 |
| 2009/0234805 A1 | 9/2009 | Golwalkar et al. | |
| 2010/0057697 A1 | 3/2010 | Golwalkar et al. | |

OTHER PUBLICATIONS

USPTO office action for U.S. Appl. No. 12/047,528, dated Jan. 25, 2011.

USPTO notice of allowance action for U.S. Appl. No. 12/198,991, dated Aug. 10, 2010.

USPTO notice of allowance action for U.S. Appl. No. 12/198,991, dated Oct. 15, 2010.

USPTO office action for U.S. Appl. No. 12/047,528, dated Aug. 6, 2010.

USPTO Notice of Allowance for U.S. Appl. No. 12/198,991, dated Aug. 10, 2010.

Office Action, dated Mar. 24, 2010, regarding U.S. Appl. No. 12/022,412, 12 pages.

Final Office Action, dated Jul. 26, 2010, regarding U.S. Appl. No. 12/022,412, 8 pages.

Notice of Allowance, dated Nov. 16, 2010, regarding U.S. Appl. No. 12/022,412, 5 pages.

Notice of Allowance, dated Jul. 22, 2011, regarding U.S. Appl. No. 12/047,528, 6 pages.

Office Action, dated Jun. 15, 2010, regarding U.S. Appl. No. 12/036,665, 13 pages.

Final Office Action, dated Jul. 7, 2010, regarding U.S. Appl. No. 12/036,665, 11 pages.

Notice of Allowance, dated Dec. 23, 2010, regarding U.S. Appl. No. 12/036,665, 6 pages.

* cited by examiner

VIRTUAL LIST VIEW SUPPORT IN A DISTRIBUTED DIRECTORY

This application is a continuation of and claims the benefit of priority to application Ser. No. 12/198,991, filed Aug. 27, 2008 and entitled "Virtual List View Support in a Distributed Directory", issued as U.S. Pat. No. 7,904,464 on Mar. 8, 2011, the contents of which are incorporated herein by reference.

BACKGROUND OF THE INVENTION

1. Field of the Invention

Embodiments of the present invention relate generally to an improved data processing system, and in particular to a computer implemented method, data processing system, and computer program product for performing a virtual list view search in a distributed directory environment using a proxy server.

2. Description of the Related Art

In today's computing environment, complex network data processing systems often are needed to facilitate work in large corporations. These complex networks may even span across regions in various worldwide locations, as well as use the Internet as part of a virtual private network for conducting business. In many instances, a federated data model is employed to allow enterprise components to share and access information and resources throughout the network. With the federated data model, wherein multiple data sources appear as one to users, data resides and is controlled locally, and client users in the system, regardless of location, needing the information may access the data using a directory service.

A directory is a special type of database for managing information about people, organizations, data processing systems, and other information sources. Information within a directory is organized within a hierarchical namespace. Each entry in the directory is a named object and consists of a set of attributes. Each attribute has a defined attribute type and one or more values. Each entry is identified by an unambiguous distinguished name (DN), wherein a distinguished name is a concatenation of selected attributes from an entry. A directory service provides a mechanism for searching a directory and for retrieving information from a directory.

Directory services serve a central repository for searching, adding, deleting and modifying data. Example methods of accessing directory services in a computer network include X.500 and Lightweight Directory Access Protocol (LDAP). Lightweight Directory Access Protocol (LDAP) is a software protocol for enabling a user to locate organizations, individuals, and other resources such as files and devices in a network, whether on the Internet or on a corporate Intranet. LDAP is a "lightweight" version of Directory Access Protocol (DAP), which is part of X.500, a standard for directory services in a network.

A directory may be distributed among many servers. In a distributed directory environment, data is partitioned across multiple directory servers, also known as backend servers. Distributed directory environments may include one or more backend servers and a proxy server that acts as an intermediate agent between a client and the distributed directory environment. Clients bind to the proxy server instead of directly binding to the backend servers.

BRIEF SUMMARY OF THE INVENTION

The illustrative embodiments provide a computer implemented method, data processing system, and computer program product for performing a virtual list view search in a distributed directory environment using a proxy server. A proxy server in a distributed directory environment receives an offset-based virtual list view search request from a client comprising sort keys, an offset, a before count, an after count, and a content count. The proxy server sends a first search request based on the sort keys defined in the offset-based virtual list view search request to a set of backend servers for a set of top entries from each backend server. The proxy server evaluates which of the backend servers has returned a top entry in the set of top entries. The proxy server sends a second search request to the backend server which had the top entry comprising a search filter for a requested entry having a sort order immediately below the top entry of a next one of the backend servers and a response control to return a number of entries starting from the top entry up to the requested entry to form an entry count. The proxy server stores the entry count incrementally as a calculated offset. The proxy server returns to the evaluating step until the calculated offset is greater than or equal to the offset sent in the offset-based virtual list view search request from the client. Responsive to a determination that the calculated offset is greater than or equal to the offset sent the offset-based virtual list view search request from the client, the proxy server determines that the backend server having a current top entry contains an entry corresponding to the offset sent in the offset-based virtual list view search request from the client. A third search request is sent to the backend server containing the current top entry to return a number of entries corresponding to the entry count having a sort order greater or equal to the sort value of the top entry to determine a target offset entry in the number of entries corresponding to the offset sent in the offset-based virtual list view search request from the client. Responsive to a determination that a complete entry set for the virtual list view search has been obtained, the proxy server creates a response control to send to the client and sends the complete entry set and the response control to the client.

DETAILED DESCRIPTION OF THE INVENTION

Figure 1:
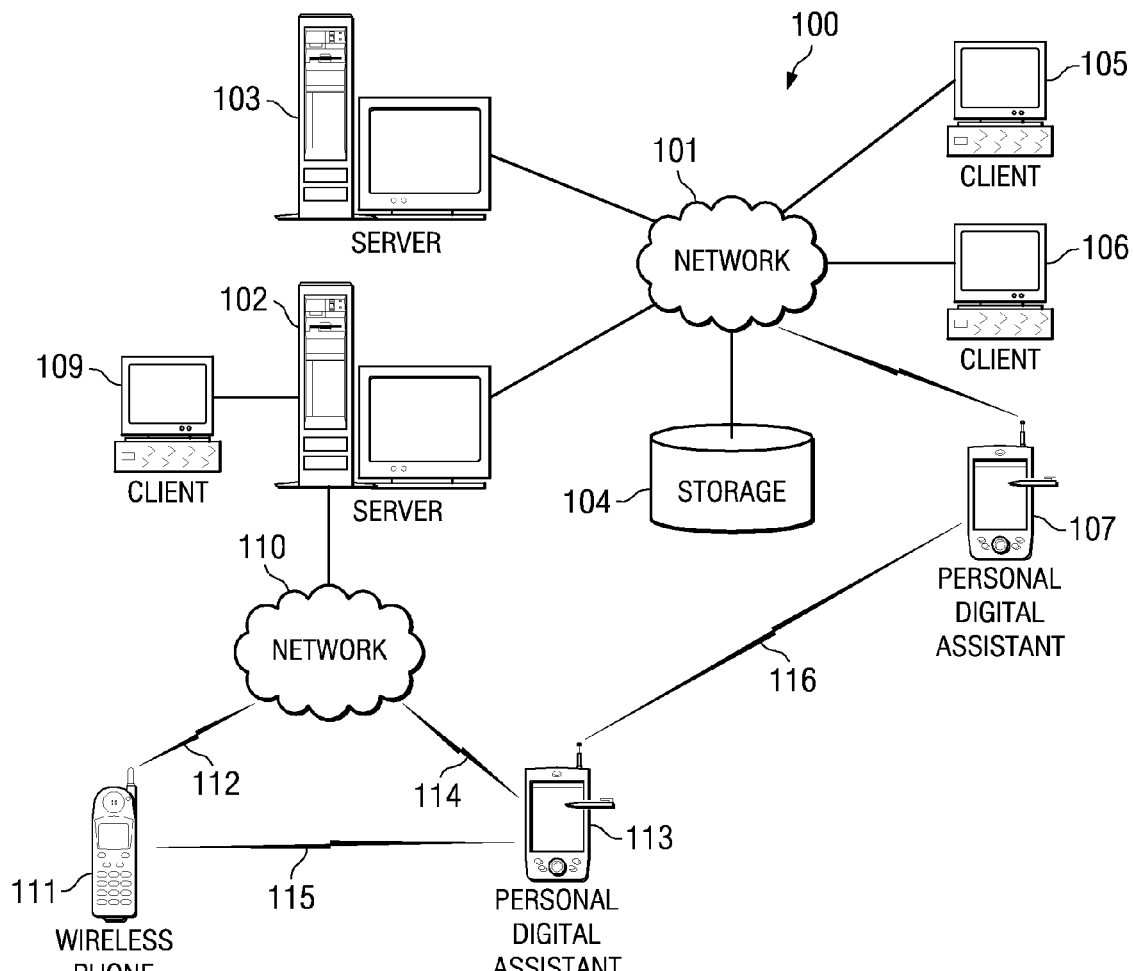
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, FIG. 1 depicts a typical network of data processing systems, each of which may implement a portion of the illustrative embodiments. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), and the like. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), and so on. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth wireless technology, to create so-called personal area networks (PAN) or personal ad-hoc networks. In a similar manner, PDA 113 can transfer data to PDA 107 via wireless communication link 116.

The illustrative embodiments may be implemented on a variety of hardware platforms; FIG. 1 is intended as an example of a heterogeneous computing environment and not as an architectural limitation for the illustrative embodiments.

Figure 2:
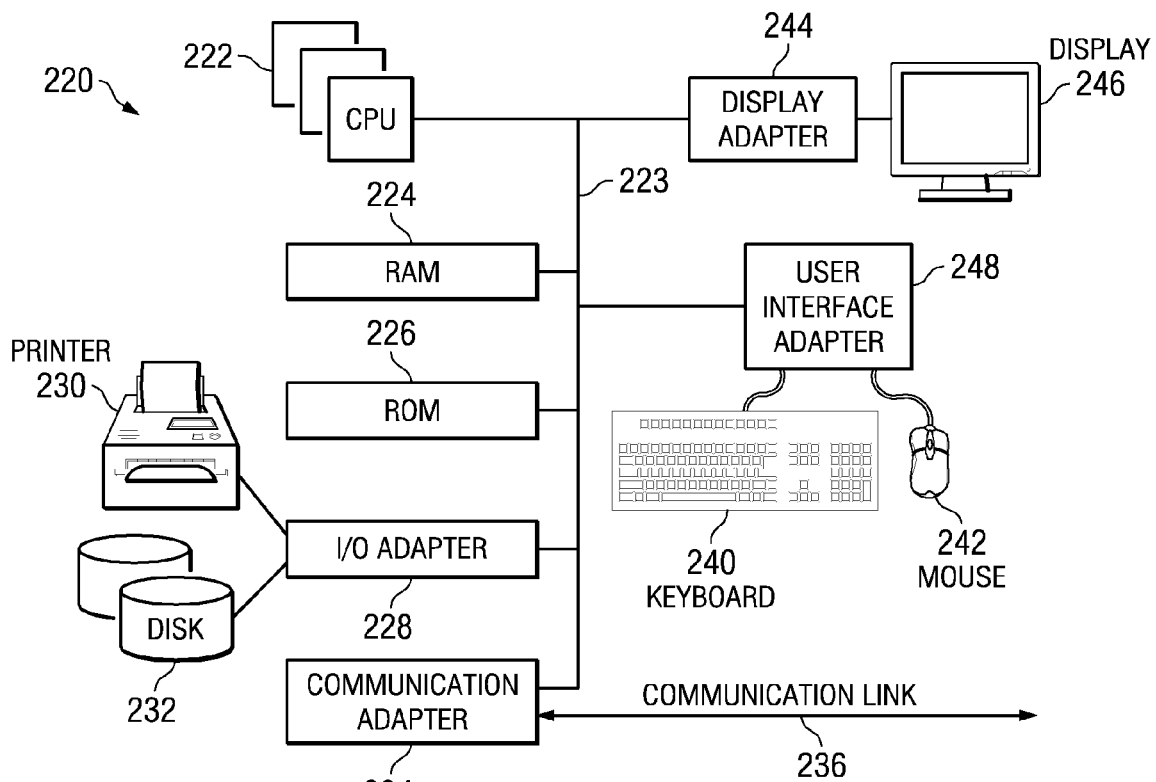
FIG. 2 is a block diagram of a typical computer architecture that may be used within a data processing system in which the illustrative embodiments may be implemented.

With reference now to FIG. 2, a diagram depicts a typical computer architecture of a data processing system, such as those shown in FIG. 1, in which the illustrative embodiments may be implemented. Data processing system 220 contains one or more central processing units (CPUs) 222 connected to internal system bus 223, which interconnects random access memory (RAM) 224, read-only memory 226, and input/output adapter 228, which supports various I/O devices, such as printer 230, disk units 232, or other devices not shown, such as an audio output system, and the like. System bus 223 also connects communication adapter 234 that provides access to communication link 236. User interface adapter 248 connects various user devices, such as keyboard 240 and mouse 242, or other devices not shown, such as a touch screen, stylus, microphone, etc. Display adapter 244 connects system bus 223 to display device 246.

Those of ordinary skill in the art will appreciate that the hardware in FIG. 2 may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 2. The depicted examples are not meant to imply architectural limitations with respect to the illustrative embodiments.

In addition to being able to be implemented on a variety of hardware platforms, the illustrative embodiments may be implemented in a variety of software environments. A typical operating system may be used to control program execution within each data processing system. For example, one device may run a UNIX operating system, while another device contains a simple Java runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The illustrative embodiments may be implemented on a variety of hardware and software platforms, as described above with respect to FIG. 1 and FIG. 2. More specifically, though, the illustrative embodiments are directed to an improved distributed data processing environment. Prior to describing the illustrative embodiments in more detail, some aspects of typical distributed data processing environments are described.

The descriptions of the figures herein may involve certain actions by either a client device or a user of the client device. One of ordinary skill in the art would understand that responses and/or requests to/from the client are sometimes initiated by a user and at other times are initiated automatically by a client, often on behalf of a user of the client. Thus, when a client or a user of a client is mentioned in the description of the figures, it should be understood that the terms "client" and "user" can be used interchangeably without significantly affecting the meaning of the described processes.

Certain computational tasks may be described below as being performed by functional units. A functional unit may be represented by a routine, a subroutine, a process, a subprocess, a procedure, a function, a method, an object-oriented object, a software module, an applet, a plug-in, an Active control, a script, or some other component of firmware or software for performing a computational task.

The descriptions of the figures herein may involve an exchange of information between various components, and the exchange of information may be described as being implemented via an exchange of messages, e.g., a request message followed by a response message. It should be noted that an exchange of information between computational components, which may include a synchronous or asynchronous request/response exchange, may be implemented equivalently via a variety of data exchange mechanisms, such as messages, method calls, remote procedure calls, event signaling, or other mechanism.

Figure 3:
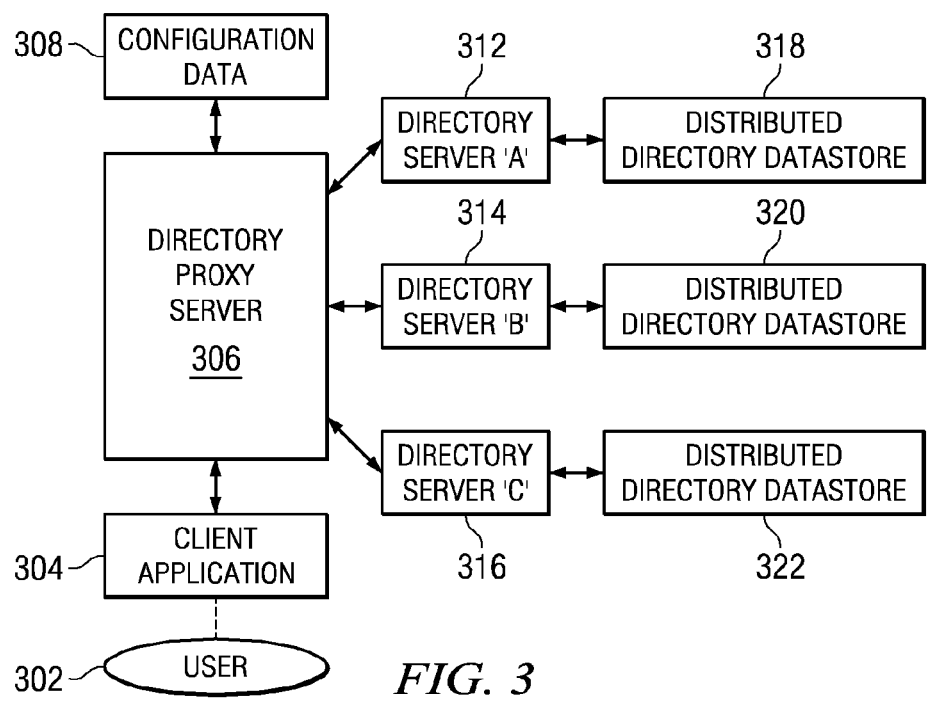
FIG. 3 depicts a block diagram that shows a typical distributed directory environment.

With reference now to FIG. 3, a block diagram depicts a typical distributed directory environment. User 302 operates client application 304, which may execute on a client device such as client 109 shown in FIG. 1. Client application 304 interacts with directory servers through a proxied directory server, also known as a directory proxy server or a proxy directory server, which is shown as proxy server 306; proxy server 306 may execute on the user's client device or elsewhere within a network of connected devices, such as those shown in FIG. 1. Proxy server 306 may be associated with configuration files 308 that contain information that is managed via an administrative user application to control the functionality of proxy server 306.

Proxy server 306 acts as an intermediate agent (an "intermediary") to the distributed directory environment. Although only one proxy server is shown, there may be multiple such proxy servers or proxy server instances running on one or more physical machines. Proxy server 306 is able to perform operations in accordance with a variety of directory schemes and protocols.

The distributed directory environment includes multiple directory servers 312-316 that interoperate within the same distributed data processing environment as proxy server 306 and client application 304, e.g., in a manner similar to the distributed data processing environment shown in FIG. 1. Directory servers 312-316 support functionality for accessing datastores that contain portions of a distributed directory, i.e. portions of a directory information tree, shown as distributed directory datastores 318-322. A typical directory datastore is a relational database management (RDBM) server.

Data entries that are of interest to a particular directory operation may reside in different portions of a distributed directory that are supported on different systems. Thus, a distributed directory is a directory environment in which data is partitioned across multiple directory servers. As illustrated in FIG. 3, the distributed directory typically comprises a collection of machines including relational database management (RDBM) servers holding data, and one or more proxy servers managing the topology. A representative proxy server may be an IBM® Tivoli® Directory Server that provides, among other functions, request routing, load balancing, failover, distributed authentication and support for distributed/membership groups and partitioning of containers. As described above, the directory proxy server sits at the front-end of a distributed directory and provides efficient routing of user requests thereby improving performance, and providing a unified directory view to the client. The proxy server also provides data support for groups and access control lists (ACLs) that are not affected by partitioning, and support for partitioning of flat namespaces.

Thus, in a distributed directory environment, data is partitioned across multiple directory servers, or backend servers, and a proxy server may act as an intermediate agent between a client and the backend servers. When the client wants to obtain data stored on the backend servers in a sorted format, the client sends a request for data to the proxy server. When searching for data across multiple directory servers, items in the directory servers may be presented to the client in a list view. A list view is used to display a list of items (e.g., the search results) to the user. In some instances however, a search request may result in a large number of items to be displayed in the list view. In a normal list view, all of these items are added to the list view and displayed to the client, which can take a considerable amount of time and memory. In some instances, the memory may not be large enough to hold all of the returned items. A faster method of displaying search results is through the use of a virtual list view (VLV). Virtual list view is a draft RFC available in http://tools.ietforg/html/draft-ietf-ldapext-ldapv3-vlv-09, which is herein incorporated by reference. A virtual list view displays search results in small, manageable subsets within a specific range of entries. In contrast with a normal list view which stores the items for display, a virtual list view does not actually store the search result data. Consequently, the virtual list view is a much faster display mechanism than a normal list view. The actual list of items retrieved from the search is stored and maintained separate from the virtual list view. The virtual list view requests only a subset of data from the external storage location that the virtual list view can display, rather than requesting the entire list of search result data.

A virtual list view has two controls—a request control and a response control. The request control is provided in the client request and specifies the desired target entry and the number of entries, both before and after the target entry, to be returned in the list. The virtual list view request control may specify an offset-based request or an assertion-based request. A virtual list view request includes a server side sorting control that may sort entries in a forward sorting method (e.g., sorts from the lowest entry up to higher entries) or a reverse sorting method (e.g., sorts from the highest entry down to lower entries). In the forward sorting method, sorting on the lowest sort key returned by a backend server indicates the lowest value for the sort key in the server. In the reverse sorting method, sorting on the highest sorted key returned by a backend server indicates the highest value for the sort key in the server.

In an offset-based virtual list view request, the client provides an offset of a target entry, a content count, a before count, and an after count. The returned entries are required to be sorted using the sort key specified in the server side sort control. Since the requested data is distributed across multiple servers, when the proxy server collects the data matching the search request from each of the backend servers, the proxy server must sort the collected data in memory before sending the data to the requesting client. The desired target entry of the sorted result set is specified by the offset value in the client offset-based virtual list view request. For example, an offset value of 1 means that the first entry in the sorted result set is the target entry. The before count in the request specifies the number of entries before the target entry to display in the result list to be sent to the client. The after count in the request specifies the number of entries after the target entry to display in the result list to be sent to the client. In an assertion-based virtual list view request, the client provides an assertion value of the target entry, a before count, and an after count. The returned entries are required to be sorted using the sort key specified in the server side sorting control. The desired target entry of the sorted result set is specified by the assertion value in the client assertion-based virtual list view request. The before count in the request specifies the number of entries before the target entry to display in the result list to be sent to the client. The after count in the request specifies the number of entries after the target entry to display in the result list to be sent to the client.

The response control is provided in a server's response to a virtual list view search request and returns the offset of the desired target entry from the result list at the server and a content count of the server's result list (i.e., the total number of entries in the list). For a virtual list view search request sent to a single backend server, the backend server will return the response control to the proxy server, which simply forwards the response control to the client. For an assertion-based virtual list view search request spanning to multiple backend servers, the proxy server will send the assertion-based search to all of the respective backend servers, and each of the backend servers will return a response control along with result entries. The total content count=summation of the content count in each backend server's response control may be calculated by the proxy server. As the offset value is also returned by each backend server, the proxy server may perform a calculation to identify the offset value to be returned in the response control. In an offset-based virtual list view search request sent to multiple backend servers in which the client specifies a content count, the backend servers will return a response control comprising the offset value (which was provided in the client request) and the content count of that server. However, the offset should be shifted according to the real content count of the servers. As described in section 5(Client-Server Interaction) of the RFC Draft titled "LDAP Extensions for Scrolling View Browsing of Search Results" found at http://tools.ietf.org/html/draft-ietf-ldapext-ldapv3-vlv-09, a server may examine the content count and offsets provided in the client request and compute the corresponding offsets within its result list, based on the server's own estimate the content count, using the following equation: $Si=Sc*(Ci/Cc)$, where $Si$ is the actual list offset used by the server, $Sc$ is the server's estimate for content count, $Ci$ is the client's submitted offset, and $Cc$ is the client's submitted content count. The result is rounded to the nearest integer. Thus, if the client specifies a content count of 10 and an offset value of 5, a server that estimates a content count of 100 will return the $50^{th}$ position in the result list as the offset value in the response control. Consequently, the real content count of all of the servers needs to be identified, and the offset shifted accordingly. To identify the real content count, the proxy server may send another offset-based virtual list view search to each backend server comprising a before count=0, after count=0, offset=1, and content count=0. In response, each backend server will return a single entry (which the proxy server will simply discard) and a virtual list view response control to the proxy server. Each response control will contain the content count for its respective backend server. The proxy server may then perform an add operation to calculate the total content count of all of the backend servers. Using the RFC Draft Section 5 equation above, the real offset (i.e., actual list offset) may then be identified by the proxy server from the offset provided by the client.

Consider the following examples of assertion and offset based virtual list view searches. Assume that a directory contains 10 entries and sort key is 'name', such that a sorted result set from directory comprises Ari, Bob, Chris, David, John, Mike, Nancy, Peter, Rosy, and Ted. An example of an offset based virtual list view request and result response may comprise the following:

Request: before count=2, after count=2, offset=3, content count=0 (content count 0 means server should use its own content count)

Result: Ari, Bob, Chris, David, John, response control will have targetPosition=3, and content count=10

Another example of an offset based virtual list view request and result response may comprise the following:

Request: before count=1, after count=0, offset=4, content count=5

Result: As server's estimation of content count=10 i.e. different from client given 5, the formula provided in RFC draft 5 should be applied Effective offset=10*(4/5)=8

Returned entries=Nancy, Peter, targetPos=8, content count=10

An example of an assertion based virtual list view request and result response may comprise the following:

Request: before count=1, after count=1, assertion=Jake

Result: As Jake is not in the list, the next name will be target position,

Result entries=David, John, Mike, targetpos=(targetpos of John)=5, content count=10, Another example of an assertion based virtual list view request and result response may comprise the following:

Request: before count=2, after count=1, assertion=Mike

Result: David, John, Mike, Nancy, targetPos=6, content count=10

Since virtual list view is based on sorted keys, and since search entries are distributed across different directory servers in a distributed directory environment, implementing the virtual list view in an optimal way on a proxy server serving a distributed directory is not a straightforward process. One existing solution to implement the virtual list view on a proxy server serving a distributed directory is to apply a brute force method, wherein the proxy server sends a search request using the same sort key present in the virtual list view offset-based request or assertion-based request made by the client to the backend servers. For example, an offset-based virtual list view search request may request a number of entries from the distributed directory which is equal to the offset+the after count or an assertion-based virtual list view search request may request the assertion value+the after count. When the proxy server obtains the sorted entries from the individual backend servers, the proxy server then re-sorts all the entries in proxy memory to identify the offset or assertion value of each entry in the list, and sends the identified entry with the before count and after count entries. However, a problem with this solution is that if the offset value or assertion value is in the range of millions, the proxy server will not have enough memory to process all the millions of entries from all backend servers. Thus, the memory requirement of the proxy may be required to greatly increase in size to accommodate large numbers of collected entries (e.g., potentially millions of entries will be placed in the proxy's memory). Thus, this existing solution is not practical or efficient when the data set returned from the backend servers grows in size.

The illustrative embodiments provide a solution to the problem above by providing an improved mechanism for performing a virtual list view search in a distributed directory environment using a proxy server. In particular, the mechanism enables the proxy server to provide virtual list view search support in a distributed directory environment while avoiding the memory space or page size issues on the proxy server in current virtual list view methods.

In one example of the illustrative embodiments, a client may send an offset-based virtual list view search to a proxy server for desired data in a distributed directory environment. The offset-based virtual list view search request may comprise a sort key which indicates how the result set returned from the backend servers should be sorted, as well as an offset value that indicates the location of the desired target entry in the sorted result set. The virtual list view search request also comprises a before count, an after count, and a content count. The before count indicates the number of entries before the target entry in the sorted result list to display in the list view, while the after count indicates the number of entries after the target entry in the sorted result list to display in the list view. The client content count indicates a total number of entries expected to be returned to the client. It should be noted that while the implementation of the virtual list view in the illustrative embodiments passes a content count in the requests, the implementation in the illustrative embodiments does not expect context identifier (ID) information used to maintain state information to be passed between the client and the server.

In response to receiving the offset-based virtual list view search request from a client, the proxy server employs an algorithm described in the illustrative embodiments to determine the offset entry in the result sets returned from the backend directory servers. The proxy server first fetches the top entry in the sorted list obtained from each of the target backend servers. The "top" sorted entry is the first entry listed in a set of sorted search results of a backend server. The top entries returned from the backend servers are called index entries, as they are used as indexes into each of the backend servers. The proxy server then re-sorts these three entries based on the sorting key in the request to determine which server (i.e., target server) contains the smallest index entry (indexVal1).

The proxy server sends a sorted search request to the target server to determine the entry in the target server that has a sorted value immediately following the second index entry (indexVal2). The sorted search request also instructs the target server to return an entry count comprising the number of entries starting with the indexVal1 entry up to the entry to be returned.

The proxy server then adds this entry count to a running entry count (which on the first iteration is 0). The running entry count is used to determine the offset entry and is incremented with every successive search. If the running entry count is less than the offset value N specified in the client request, the proxy server assigns the entry returned in the previous sorted search as the top index entry for the target server. The proxy server repeats the previous steps of resorting the new index entry set, collecting a new entry count, and adding the new entry count to the running entry count until the running entry count is equal to or greater than the offset value N specified in the client request.

If the running entry count is greater than or equal to the offset value N supplied in search request, the proxy server knows the current target server is the backend server that contains the offset entry. The proxy server may determine the offset entry by sending another sorted search request to that backend server that locates the Nth offset entry in the returned list of entries.

Once the proxy server has determined the offset entry, the proxy server determines if the number of entries before the Nth offset entry within the current entry list is greater than or equal to the before count specified in the client request and the number of entries after the Nth offset entry is greater than or equal to the after count specified in the client request. If so, the proxy server sends the current entry list to the client.

However, if the number of entries before the Nth offset entry within the entry list is not greater than or equal to the before count specified in the client request and the number of entries after the Nth entry is not greater than or equal to the after count specified in the client request, the entry set is a not complete entry set, and the proxy server sends an assertion-based virtual list view request to each backend server in the distributed directory. The assertion-based virtual list view request comprises the before count b and the after count a specified in the client request, as well as an assertion value based on the target entry (Nth entry) within the returned list of entries. Thus, the assertion-based virtual list view request requests that each backend server returns the entry matching the assertion value (Nth entry in a sorted list of entries on the backend server), b number of entries before the Nth entry, and a number of entries after the Nth offset entry. The proxy server then sorts the results returned from all the backend servers using the sort key SN and locates the Nth entry in the result list by using the distinguished name (DN) of the Nth entry. The proxy server also locates the before entries and the after entries from the sorted list to form the complete result set. Since this result set comprises only the Nth entry and a certain number of entries before and after the Nth entry within each backend server, this result set is a smaller result set than a result set comprising all matching entries from the backend server. Consequently, this result set may be sorted in proxy memory using sort key SN. The proxy server then sends the final result set to the client.

In another example of the illustrative embodiments, a client may send an assertion-based virtual list view search to a proxy server for desired data in a distributed directory environment. The assertion-based virtual list view search request may comprise a sort key which indicates how the result set returned from the backend servers should be sorted, as well as an assertion value that indicates the value of the desired target entry in the sorted result set. The assertion-based virtual list view search request also comprises a before count and an after count.

In response to receiving the assertion-based virtual list view search request from a client, the proxy server sends the assertion-based virtual list view search request to each of the backend servers in the distributed directory. Each backend server will return a response control and a sorted result list to the proxy server. The response control includes the offset of the target entry and the content count of the server, and the sorted result list comprises the target entry corresponding to the assertion value on that server and a number of entries before the target entry according to the before count, and a number of entries after the target entry according to the after count. The proxy server sorts all of the results returned from the backend servers using the sort key, locates the target entry in the sorted list based on assertion value, and locates the before entries and after entries in the sorted list based on the before count and after count to form a complete entry set. The proxy server then sends this final result set to the client.

The illustrative embodiments may be implemented using X.500 directories and Lightweight Directory Access Protocol (LDAP) operations, as well as using a variety of directory implementation schemes and protocols. The illustrative embodiments may extend to any distributed data environment having an agent or proxy server aware of the partitioning of the data across the distributed databases.

Figure 4:
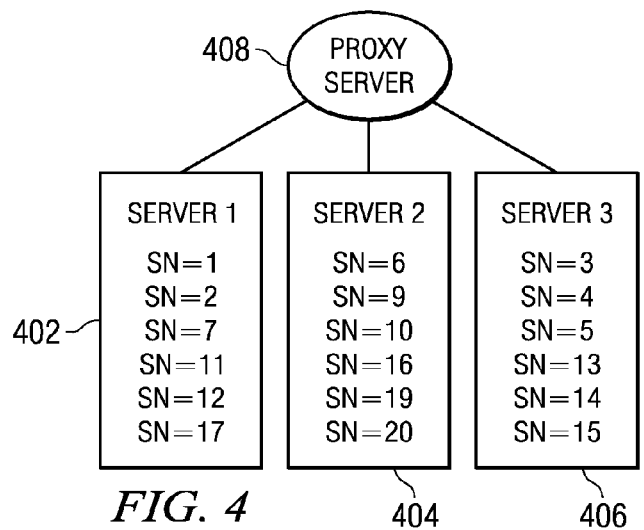
FIG. 4 illustrates how the virtual list view search algorithm may be implemented in a distributed directory environment in accordance with the illustrative embodiments.

FIG. 4 illustrates how the virtual list view search algorithm may be implemented in a distributed directory environment in accordance with the illustrative embodiments. In this illustrative example, the distributed directory environment comprises three backend servers. Backend servers 402, 404, and 406 are examples of directory servers in a distributed directory environment, such as directory servers 312-316 in FIG. 3.

In one embodiment, a client may send an offset-based virtual list view search request for data in a sorted format to the proxy server. The offset-based virtual list view search request defines the data desired by the client and comprises a sort key SN, an offset value N, a before count b, and an after count a. As shown, the requested data is stored across multiple backend servers (402, 404, and 406). The data entries matching the client request on each backend server are represented for purposes of illustration in FIG. 4 by their sort key values (SN=1 to SN=20 in this example). The data entries on each backend server are also sorted based on the sort key from the client. As server side sorting control is provided in virtual list view request which sorts entries either in a forward sorting method (e.g., sorts from the lowest entry up to higher entries) or a reverse sorting method (e.g., sorts from the highest entry down to lower entries). For instance, if the forward sorting method sorts on the lowest sort key returned by a backend server indicates the lowest value for the sort key in the server, the reverse sorting method sorts on the highest sorted key returned by a backend server indicates the highest value for the sort key in the server. For example, the sorting compare logic for a forward sorting method in the sorting control may comprise compare (a,b) which returns true if a$\leq$b. In contrast, the sorting compare logic for the reverse sorting method in the sorting control may comprise r_compare (a,b) which returns true if a$\geq$b Consider one example in which the virtual list view search request comprises an offset value N=4, a before count b=1, and an after count a=1. Proxy server 408 may implement the virtual list view search algorithm in the illustrative embodiments by locating, in a sorted search result list returned from backend servers, the offset entry corresponding to the offset value N specified in the client request. In a first step of the algorithm, upon receiving the virtual list view search request, proxy server 408 sends a sorted search with sort key SN and to each of the backend servers 402, 404, and 406. The sorted search also comprises a request for a page size limit of 1, meaning that only one entry from each of the backend servers will be returned to proxy server 408. Thus, the sorted search request requests a single entry from each of the backend servers. The results of the sorted search are shown in backend servers 402, 404, and 406. The single entry returned to proxy server 408 from each of backend servers 402, 404, and 406 is the top sorted entry in the sorted searches (e.g., SN=1, SN=6, SN=3). These top sorted entries are the index entries. As the index entries are obtained from each backend server, the index entries are stored in an index array on proxy server 408. An array index denotes the partition index of the backend server from which the result was received.

The second step of the algorithm comprises having proxy server 408 resort these three entries (SN=1, SN=6, SN=3) based on the sorting key SN in the request in order to locate the smallest index entry. For instance, if the sort key specifies that the index entries are to be sorted in alphabetical order, an index entry that begins with the first or lowest letter (e.g., "A") will be the first index entry (e.g., indexVal1), the index entry that begins with the next lowest letter (e.g., "C") will be the second index entry (e.g., indexVal2), etc. The backend server associated with the lowest or "top" index entry (e.g., indexVal1) is the target backend server. From the sorted order of index entries (SN=1, SN=3, SN=6), proxy server 408 may determine which of the index entries is the top sorted entry. In this example, entry SN=1 is the top index entry.

In a third step of the algorithm, proxy server 408 sends a sorted search request to the target server which returned the top index entry (e.g., backend server 402). This sorted search request requests only a single entry (i.e., the request specifies a page size limit of 1) from the target server. The sorted search request comprises the sort key SN and a new search filter created by proxy server 408, wherein the new filter is created to obtain the value in the target backend server that immediately follows the second index value (e.g., SN>indexVal2), which was determined in the second step. The sorted search request also comprises a new control that contains a distinguished name of the top index entry (e.g., indexDN1). This new control instructs the target backend server to return an entry count, wherein the entry count comprises the number of entries between (and including) the top index entry on the current target server and (but not including) the requested entry to be returned from this sorted search. In this example, the sorted search request returns a single sorted entry from target backend server 402 that has a value greater than index entry SN=3 and a number of entries with starting point SN=1. Thus, the result of the sorted search request from the target backend server 402 is entry SN=7, and the number of entries greater than or equal to top index entry SN=1 but less than the single entry SN=7 indicates an entry count of 2. Entries SN=3 and SN=6 remain in the list of top index entries.

The fourth step of the algorithm comprises having proxy server 408 add the entry count 2 which was returned in the third step to a running entry count. The running entry count keeps track of the number of entry counts in each successive sorted search request by the proxy server for the client virtual list view search request. Prior to the first iteration of the algorithm, the running entry count is set at 0.

In a fifth step of the algorithm, proxy server 408 determines if the current running entry count is less than the offset value (N=4) specified in the client search request. If the current running entry count is less than the offset value (e.g., 2<N), proxy server 408 assigns the entry from the target server returned in the third step as the index entry for the target server. For instance, entry SN=7 is assigned to be the index entry for backend server 402. Proxy server 408 then repeats the second through fourth steps for the current index entry set. Thus, proxy server 408 repeats the second step by sorting the current index entries (SN=3, SN=6, SN=7) based on the sort key SN. In this example, entry SN=3 is now the top index entry. Proxy server 408 repeats the third step by sending a sorted search request to the target server which returned the current top index entry SN=3 (e.g., backend server 406). The sorted search request comprises sort key SN and a new search filter created to provide the entry from the current target server (backend server 406) which has a sort value immediately following the second index value in the previous step (SN=6), as well as the number of entries between the top index value SN=3 and the single entry to be returned from the sorted search. Thus, the result of the sorted search request from target backend server 406 is entry SN=13 and an entry count of 3. Entries SN=6 and SN=7 remain in the list of top index entries. Proxy server 408 also repeats the fourth step by adding this entry count of 3 to the running entry count of 2, thereby increasing the current running entry count to 5.

Since the running entry count of 5 is now greater than or equal to the offset value N=4, proxy server 408 may perform the sixth step of the algorithm, as the current target backend server 406 contains the desired Nth offset entry. In this step, proxy server 408 determines the before count entries and the after count entries of the known offset entry by requesting a sorted search against the current target server that contains the desired Nth offset entry with a page size limit equal to the entry count. This sorted search request comprises the sort key SN and another new search filter (SN≧indexVal1) which obtains a number of entries equal to the entry count that have a sort value greater than or equal to the sort value of the top index value of the current target server. Thus, the sorted search request comprises a search against backend server 406, with a sort key SN≧3 and a page size of 3. The result of the sorted search request from target backend server 406 comprises a list of entries SN=3, SN=4, and SN=5.

Within the list of entries, proxy sever 408 locates the Nth offset entry in the seventh step of the algorithm. Proxy server 408 determines which entry in the result list obtained in the sixth step is the Nth offset entry using the following equation: (N−running entry count+entry count). Since the Nth offset value is 4, the running entry count is 5, and the entry count for the current result entry SN=13 is 3, the Nth offset entry is 4−5+3, or 2. Thus, the Nth offset entry is the second entry in the result list, or SN=4.

In the eighth step of the algorithm, proxy server 408 determines whether there is a complete entry set to return to the requesting client. A complete entry set complete a result set that includes the offset entry requested by the client, as well as a number of entries before the offset entry as specified by the before count in the client request and a number of entries after the offset entry as specified by the after count in the client request. Proxy server 408 determines if the number of entries before the Nth offset entry within the result list in the sixth step is greater than or equal to the before count b and the number of entries after the Nth offset entry is greater than or equal to the after count a. Since the number of entries before Nth offset entry SN=4 is 1 and the number of entries after the Nth SN=4 offset entry is 1, a complete entry set has been obtained. The complete entry set comprises a list of entries SN=3, SN=4, and SN=5. Consequently, proxy server 408 may return the complete entry set to the client, thereby completing the request.

However, if a complete entry set has not been obtained, proxy server 408 may perform an assertion-based virtual list view search to each backend server 402, 404, and 406. As proxy server 408 knows the Nth offset entry is in the result list obtained in the sixth step, the assertion-based virtual list view search request comprises the key value of the Nth offset entry. The assertion-based virtual list view search requests b number of entries before the Nth offset entry, and a number of entries after the Nth offset entry from all backend servers. Since the assertion-based virtual list view search is sent to all of the backend servers, the proxy server receives more than the desired number of entries to return to the client. Upon receiving the results from the assertion-based virtual list view search request, proxy server 408 sorts the results from all the backend servers in memory using the sort key SN. Once sorted, the Nth offset entry is located in the sorted result list by using the distinguished name (DN) of the Nth offset entry. The before entries and the after entries are also located from the sorted list to form the complete result set. The remaining entries are discarded. Consequently, proxy server 408 may return the complete entry set to the client, thereby completing the request.

Consider another example in which the virtual list view search request comprises an offset value N=7, a before count b=2, an after count a=2, and a sort key SN that sorts on SN value. In the first step, proxy server 408 obtains the index entries SN=1, SN=6, and SN=3 from backend servers 402, 404, and 406. Proxy server 408 sorts the index entries in the second step with sort key SN to determine the target backend server, or backend server 402. The sorted result is SN=1, SN=3, and SN=6.

Proxy server 408 searches for the sorted entry in target backend server 402 in the third step with a sort value SN>3, a page size of 1, and a control requesting number of entries with starting point SN=1. The resulting entry returned from the target backend server is SN=7 and an entry count of 2. In the fourth step, proxy server 408 adds the entry count to the running entry count, such that the running entry count is 2.

As the offset value N specified in the client request is 7, the running entry count is still less than N (2<N). Proxy server 408 assigns the entry SN=7 from the target server returned in the third step as the index entry for the current target backend server 402 and then repeats steps two through four to with the new index entries SN=3, SN=6, and SN=7 until the offset (i.e., running entry count) obtained in step four is greater than or equal to the offset value supplied in the client request. For instance, the new target server for new index entries SN=3, SN=6, and SN=7 is backend server 406. Proxy server 408 searches for sorted entries against target backend server 406 with a sort value SN>6, a page size of 1, and a control requesting the number of entries with starting point of SN=3. The resulting entry is SN=13, with an entry count of 3. The addition of this entry count to the running entry count is still not equal or greater than the offset value in the client request (5<N), so steps two through four are repeated again.

With new sorted index entries SN=6, SN=7, and SN=13, proxy server 408 searches for sorted entries against new target backend server 404 with a sort value SN>7, a page size of 1, and a control requesting number of entries with starting point SN=6. The result entry is SN=9, and an entry count of 1. The addition of this entry count to the running entry count is still not equal to or greater than the offset value in the client request (6<N), so steps two through four are repeated again.

With new sorted index entries SN=7, SN=9, and SN=13, proxy server 408 searches for sorted entries against new target backend server 404 with a sort value SN>9, a page size of 1, and a control requesting number of entries with starting point SN=7. The result entry is SN=11, and an entry count of 1. At this point, the addition of this entry count to the running entry count is now equal to or greater than the offset value in the client request (7≧N), so proxy server 408 performs the sixth step of searching for a sorted entry in the current target backend server 402 with a sort value SN≧7 and a page size of 1. The result returned is SN=7, with an entry count of 1.

Proxy server 408 then performs the eighth step of determining if there is a complete entry set to return to the requesting client by determining if the number of entries before the Nth offset entry within the set in the sixth step is greater than or equal to the before count b and the number of entries after the Nth offset entry is greater than or equal to the after count a (7−7+1=1). Since only a single entry was returned in step six, a complete entry set has not been returned. Consequently, proxy server 408 performs an assertion-based virtual list view search to all backend servers 402, 404, and 406 using key value of SN=7 and sorting by SN, requesting two before entries and two after entries from each backend server. Consequently, proxy server 408 will receive entries SN=1, 2, 7, 11, 12 from server 402, entries SN=6, 9, 10, 16 from server 404, and entries SN=4, 5, 13, 14, 15 from server 406. Proxy server 408 will then sort all these received entries in its memory. It should be noted this result set is smaller result set than one that requests all matching entries from each of the backend servers, and may be containable in the proxy server memory available. The sorted result set in the proxy server memory will include the entries SN=1, 2, 4, 5, 6, 7, 9, 10, 11, 12, 13, 14, 15. Proxy server 408 may then locate the target index entry in the sorted result set which was identified as the entry having sort key SN=7. Since the proxy server also needs to return two before counts and two after counts to the client, the result set to be returned to client will include the entries SN=5, 6, 7, 9, 10. Proxy server 408 may return the complete sorted entry set SN=5, SN=6, SN=7, SN=9, SN=10 to the client, thereby completing the client request. The remaining entries in the proxy server memory will be discarded.

Figure 5A:
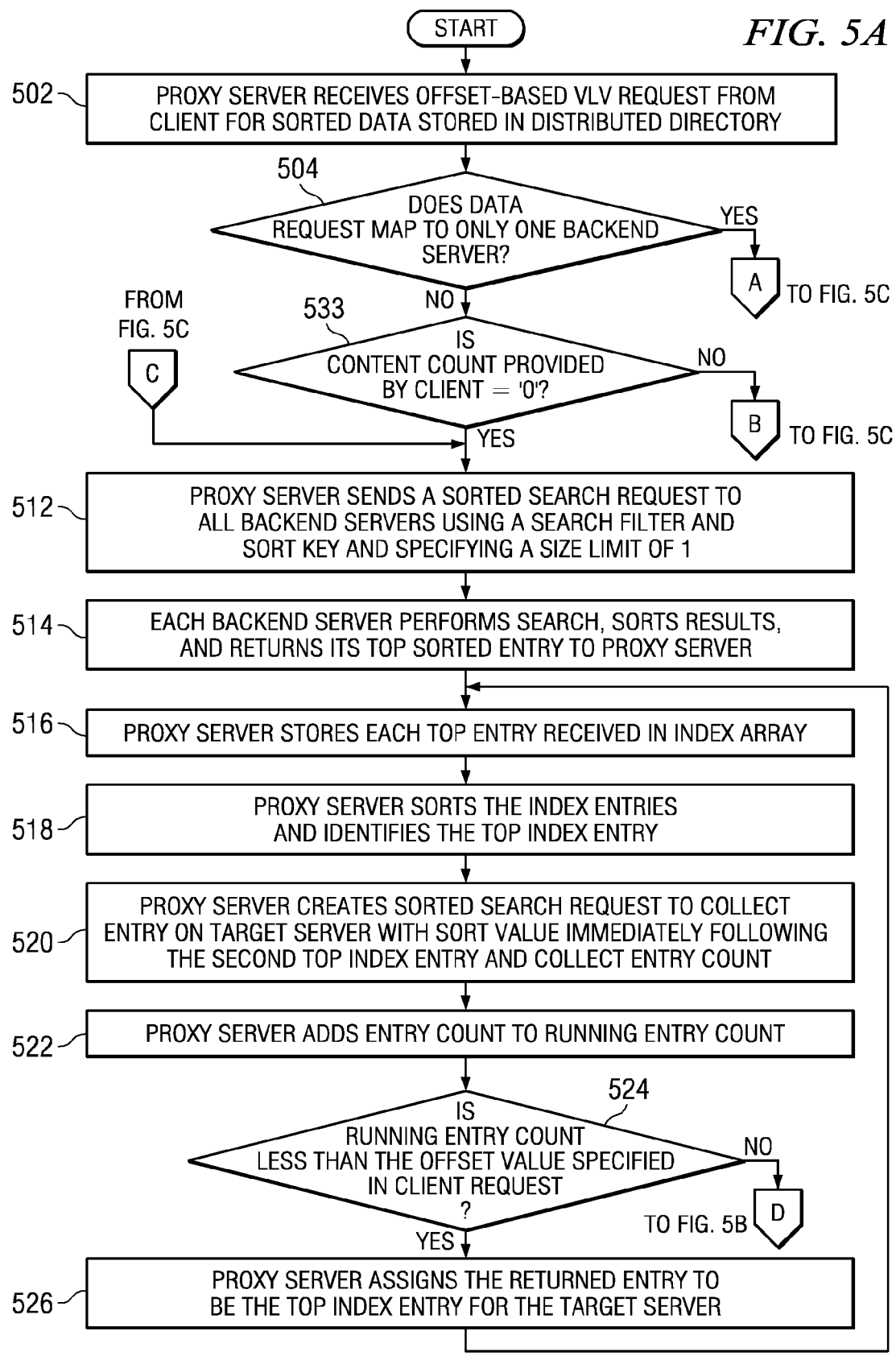
FIGS. 5A, 5B and 5C illustrate a flowchart of a process for performing an offset-based virtual list view search in a distributed directory environment using a proxy server in accordance with the illustrative embodiments.
Figure 5B:
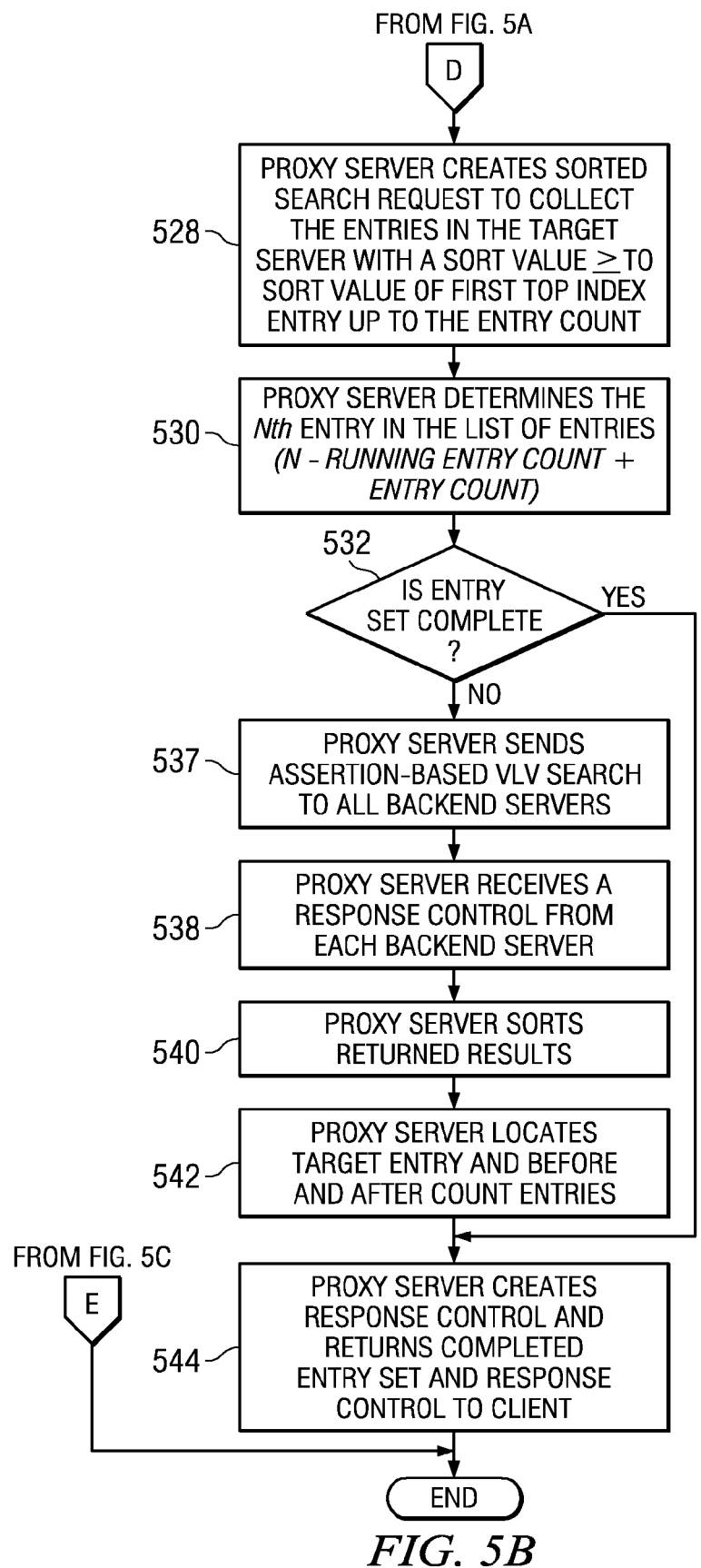
Figure 5C:
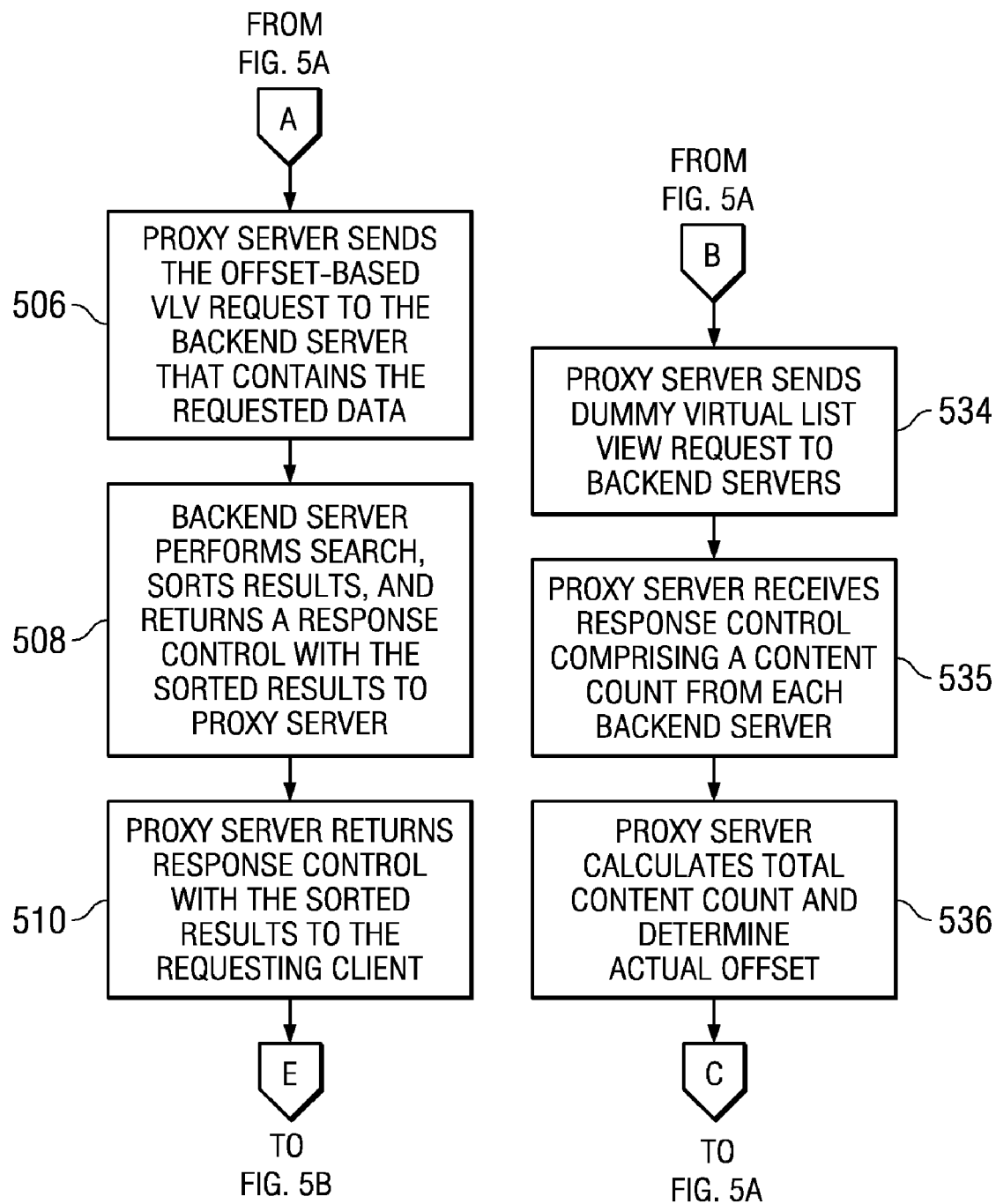

FIGS. 5A, 5B and 5C illustrate a flowchart of a process for performing an offset-based virtual list view sorted search in a distributed directory environment using a proxy server in accordance with the illustrative embodiments. The process described in FIGS. 5A, 5B and 5C may be implemented using a proxy server in a distributed directory environment such as depicted in FIG. 3.

The process begins when the client sends an offset-based virtual list view request for sorted data stored in the distributed directory to the proxy server (step 502). The client request comprises a virtual list view search request with a sort key, an offset value, a content count, a before count, and an after count. When the proxy server receives the request information, the proxy server determines whether the requested search maps to only one backend server in the distributed directory environment (e.g., a client request for personnel data on a group of employees who work in the same office or city) (step 504). If the requested search only maps to one backend server ('yes' output of step 504), the proxy server sends the same offset-based virtual list view request to the backend server that contains the requested data (step 506). The backend server performs the search, and returns the appropriate result to the proxy server 508). The proxy server, in turn, returns the result to the requesting client (step 510).

Turning back to step 504, if the requested search maps to more than one backend server ('no' output of step 504), the proxy server makes a determination whether the content count provided by the client=0 (step 533). If the content count provided by the client is 0 ('yes' output of step 533), the process continues to step 512.

However, if the content count provided by the client is not 0 ('no' output of step 533), then the proxy server sends a dummy virtual list view request to all of the backend servers to identify the real content count (step 534). The dummy virtual list view request comprises an offset-based virtual list view search comprising a before count=0, after count=0, offset=1, and content count=0. The proxy server will receive a single entry (which the proxy server will simply discard) and a virtual list view response control from each backend server (step 535). Each response control will contain the content count for its respective backend server. The proxy server may then perform an add operation to calculate the total content count of all of the backend servers, and, using the RFC Draft Section 5 equation above, the proxy server may identify the real offset (i.e., actual list offset) using the offset provided by the client (step 536).

The proxy server then sends a sorted search request to all of the backend servers in the distributed directory using the sort key from the client (step 512). The sorted search request requests a single entry from each of the backend servers (i.e., a size limit of 1). Each backend server performs the search, sorts the data results, and returns its top (first) entry in the sorted search data to the proxy server (step 514). The proxy server stores each top entry received in an index array (step 516).

The proxy server then sorts these index entries by their sort key values and identifies the target backend server as the backend server associated with the top index entry (step 518). The proxy server creates a new search filter in a sorted search request which collects an entry on the target backend server with a sort value that immediately follows the sort value of the second top index entry and a new control that collects the entry count comprising the number of entries between (and including) the top index entry on the current target server and (but not including) the requested entry to be returned from this sorted search (step 520). The proxy server adds the entry count to a running entry count that keeps track of the number of entry counts in each successive sorted search request by the proxy server (step 522).

The proxy server then makes a determination as to whether the current running entry count is less than the offset value specified in the client request (step 524). If the current running entry count is less than the offset value ('yes' output of step 524), the proxy server assigns the entry from the target server returned in step 520 as the index entry for the current target server (step 526). Proxy server then repeats steps 516 to

522 until the current running count is equal to or greater than the offset value specified in the client request.

Turning back to step 524, if the current running entry count is greater than or equal to the offset value specified in the client request ('no' output of step 524), the proxy server creates a new search filter in a sorted search request with a page size limit equal to the entry count to collect the entries in the target server up to the entry count that have a sort value that is greater or equal to the sort value of the first top index entry (step 528). The proxy server determines the Nth offset entry in the collected list of entries using the following equation: (N−running entry count+entry count) (step 530).

A determination is then made by the proxy server as to whether a complete entry set to return to the requesting client (step 532). If the number of entries before the Nth entry within the set collected in step 528 is greater than or equal to the before count specified in the client request and the number of entries after the Nth offset entry is greater than or equal to the after count specified in the client request, the entry set is a complete entry set ('yes' output of step 532), and the proxy server creates a response control and returns the completed entry set and the response control to the client (step 544).

Turning back to step 532, if the number of entries before the Nth offset entry within the set collected in step 528 is not greater than or equal to the before count specified in the client request and the number of entries after the Nth offset entry is not greater than or equal to the after count specified in the client request, the entry set is a not complete entry set ('no' output of step 532), and the proxy server sends an assertion-based virtual list view search request to each backend server in the distributed directory, with the Nth offset entry as the assertion value, b as the number of entries before the Nth offset entry, and a as the number of entries after the Nth offset entry (step 537). The proxy server receives a response control from each backend server (step 538). The total content count=summation of the content count in each backend server's response control may be calculated by the proxy server, and the proxy server sorts all of the results returned from the backend servers using the sort key SN to form a sorted list (step 540). As the offset value is also returned by each backend server, the proxy server may perform a calculation to identify the offset value to be returned in the response control. The proxy server also locates the Nth offset entry in the result list by using the distinguished name (DN) of the Nth offset entry and locates the before entries and the after entries from the sorted list to form the complete result set (step 542). The proxy server then creates a response control and returns the completed entry set and the response control to the client (step 544).

Figure 6:
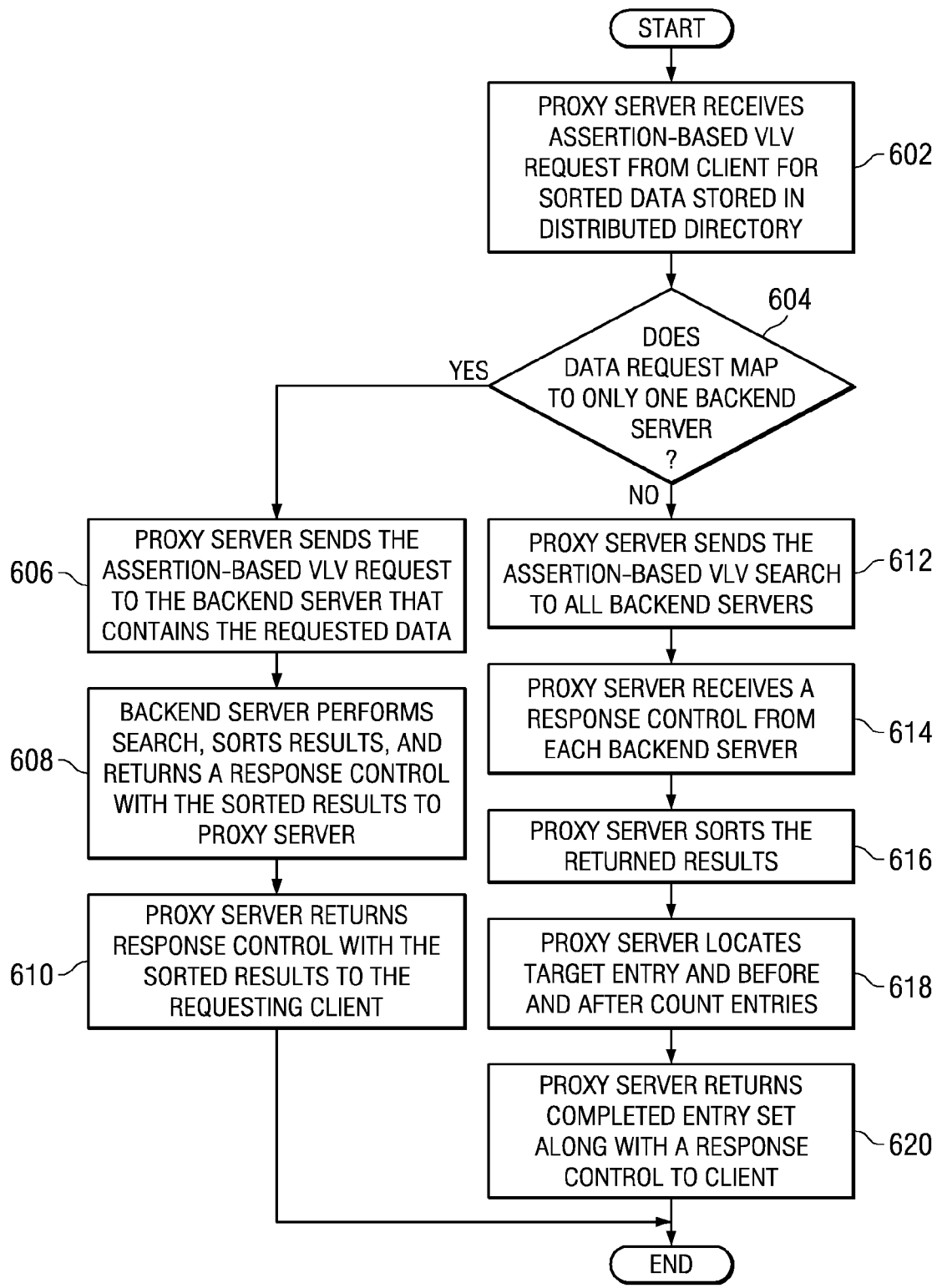
FIG. 6 illustrates a flowchart of a process for performing an assertion-based virtual list view search in a distributed directory environment using a proxy server in accordance with the illustrative embodiments.

FIG. 6 illustrates a flowchart of a process for performing an assertion-based virtual list view search in a distributed directory environment using a proxy server in accordance with the illustrative embodiments. The process described in FIG. 6 may be implemented using a proxy server in a distributed directory environment such as depicted in FIG. 3.

The process begins when the client sends an assertion-based virtual list view request for data stored in the distributed directory to the proxy server (step 602). The client request comprises a virtual list view search request with a sort key, an assertion value, a before count, and an after count. When the proxy server receives the request information, the proxy server determines whether the requested search maps to only one backend server in the distributed directory environment (step 604). If the requested search only maps to one backend server ('yes' output of step 604), the proxy server sends the same assertion-based virtual list view request to the backend server that contains the requested data (step 606). The backend server performs the search, and returns the response control comprising an offset of the target entry and a content count of the server, and the sorted result list to the proxy server (step 608). The proxy server, in turn, returns the response control and the sorted results to the requesting client (step 610).

Turning back to step 604, if the requested search maps to more than one backend server ('no' output of step 604), the proxy server sends the assertion-based virtual list view search request to all of the backend servers in the distributed directory (step 612). The proxy server receives a response control from each backend server comprising the offset of the target entry and the content count of the server and a sorted result list, wherein each list comprises the target entry corresponding to the assertion value on that server and a number of entries before the target entry according to the before count, and a number of entries after the target entry according to the after count (step 614). The total content count=summation of the content count in each backend server's response control may be calculated by the proxy server. The proxy server sorts all of the results returned from the backend servers using the sort key to form a sorted list (step 616). As an offset value is also returned by each backend server, the proxy server may perform a calculation based on the assertion value to determine the target offset value to be returned in the response control for the sorted list of entries to be returned to the client. The proxy server then locates this target offset entry in the sorted list and locates the before entries and after entries in the sorted list based on the before count and after count to form a complete entry set (step 618). The proxy server then returns the completed entry set along with the response control to the client (step 620).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for performing, by a proxy server, a virtual list view search in a distributed directory environment using a proxy server, the computer implemented method comprising:

responsive to receiving an offset-based virtual list view search request from a client comprising sort keys, an offset, a before count, an after count, and a content count, sending a first search request based on the sort keys defined in the offset-based virtual list view search request to a set of backend servers for a set of top entries from each backend server;

evaluating which of the backend servers has returned a top entry in the set of top entries;

sending a second search request to the backend server which had the top entry comprising a search filter for a requested entry having a sort order immediately below the top entry of a next one of the backend servers and a response control to return a number of entries starting from the top entry up to the requested entry to form an entry count;

storing the entry count incrementally as a calculated offset;

returning to the evaluating step until the calculated offset is greater than or equal to the offset sent in the offset-based virtual list view search request from the client;

responsive to a determination that the calculated offset is greater than or equal to the offset sent the offset-based virtual list view search request from the client, determining that the backend server having a current top entry contains an entry corresponding to the offset sent in the offset-based virtual list view search request from the client;

sending a third search request to the backend server containing the current top entry to return a number of entries corresponding to the entry count having a sort order greater or equal to the sort value of the top entry to determine a target offset entry in the number of entries corresponding to the offset sent in the offset-based virtual list view search request from the client;

responsive to a determination that a complete entry set for the virtual list view search has been obtained, creating a response control to send to the client; and sending the complete entry set and the response control to the client.

2. The computer implemented method of claim 1, further comprising:

responsive to a determination that a complete entry set for the virtual list view search has not been obtained, sending an assertion-based virtual list view search to the set of backend servers based on the sort keys of the offset entry;

receiving entries and a response control from each backend server in the set of backend servers;

sorting the set of entries returned by backend servers;

determining, based on the offset, before count, and after count sent in the offset-based virtual list view search request from the client, the offset entry, a number of entries in the set of entries before the offset entry, and a number of entries in the set of entries after the offset entry to form a complete entry set;

creating a response control to send to the client; and sending the complete entry set and the response control to the client.

3. The computer implemented method of claim 1, further comprising:
- responsive to receiving the offset-based virtual list view search request from the client, determining if the offset-based virtual list view search request maps to only one backend server;
- responsive to a determination that the offset-based virtual list view search request maps to only one backend server, sending the offset-based virtual list view search request to the only one backend server; and
- sending a sorted entry set as returned by the backend server to the client.

4. The computer implemented method of claim 3, further comprising:
- responsive to a determination that the offset-based virtual list view search request maps to more than one backend server, determining if the content count provided in the offset-based virtual list view search request by the client is not 0;
- responsive to a determination that the content count provided in the offset-based virtual list view search request by the client is not 0, sending a second offset-based virtual list view search request to the set of backend servers comprising before count=0, after count=0, offset=1, and content count=0;
- responsive to receiving a content count from each backend server, calculating a total content count comprising a summation of the content counts of all of the backend servers;
- determining an actual offset corresponding to the offset in the client request based on the total content count;
- responsive to determining the actual offset, determining before count entries and after count entries from the actual offset in the set of entries to form a complete entry set;
- creating a response control to send to the client; and
- sending the complete entry set and the response control to the client.

5. The computer implemented method of claim 1, wherein the top entries comprise a lowest sorted entry from each backend server in the set of backend servers.

6. The computer implemented method of claim 1, wherein the top entries comprise a highest sorted entry from each backend server in the set of backend servers.

7. The computer implemented method of claim 1, wherein the set of top entries are stored in an index array on the proxy server.

8. The computer implemented method of claim 1, wherein evaluating which of the backend servers has returned a top entry of the set of top entries comprises:
- sorting the set of top entries to determine the top entry in the set of top entries; and
- identifying the backend server which returned the top entry.

9. The computer implemented method of claim 1, wherein the response control comprises the target offset entry and a total content count of the complete entry set.

10. A computer program product for performing, by a proxy server, a virtual list view search in a distributed directory environment using a proxy server, the computer program product comprising:
- a non-transitory computer usable medium having computer usable program code tangibly embodied thereon, the computer usable program code comprising:
- computer usable program code for sending, in response to receiving an offset-based virtual list view search request from a client comprising sort keys, an offset, a before count, an after count, and a content count, a first search request based on the sort keys defined in the offset-based virtual list view search request to a set of backend servers for a set of top entries from each backend server;
- computer usable program code for evaluating which of the backend servers has returned a top entry in the set of top entries;
- computer usable program code for sending a second search request to the backend server which had the top entry comprising a search filter for a requested entry having a sort order immediately below the top entry of a next one of the backend servers and a response control to return a number of entries starting from the top entry up to the requested entry to form an entry count;
- computer usable program code for storing the entry count incrementally as a calculated offset;
- computer usable program code for returning to the evaluating step until the calculated offset is greater than or equal to the offset sent in the offset-based virtual list view search request from the client;
- computer usable program code for determining, in response to a determination that the calculated offset is greater than or equal to the offset sent the offset-based virtual list view search request from the client, that the backend server having a current top entry contains an entry corresponding to the offset sent in the offset-based virtual list view search request from the client;
- computer usable program code for sending a third search request to the backend server containing the current top entry to return a number of entries corresponding to the entry count having a sort order greater or equal to the sort value of the top entry to determine a target offset entry in the number of entries corresponding to the offset sent in the offset-based virtual list view search request from the client;
- computer usable program code for creating, in response to a determination that a complete entry set for the virtual list view search has been obtained, a response control to send to the client; and
- computer usable program code for sending the complete entry set and the response control to the client.

11. The computer program product of claim 10, further comprising:
- computer usable program code for sending, in response to a determination that a complete entry set for the virtual list view search has not been obtained, an assertion-based virtual list view search to the set of backend servers based on the sort keys of the offset entry;
- computer usable program code for receiving entries and a response control from each backend server in the set of backend servers;
- computer usable program code for sorting the set of entries returned by backend servers;
- computer usable program code for determining, based on the offset, before count, and after count sent in the offset-based virtual list view search request from the client, the offset entry, a number of entries in the set of entries before the offset entry, and a number of entries in the set of entries after the offset entry to form a complete entry set;
- computer usable program code for creating a response control to send to the client; and
- computer usable program code for sending the complete entry set and the response control to the client.

12. The computer program product of claim 10, further comprising:
computer usable program code for determining, in response to receiving the offset-based virtual list view search request from the client, if the offset-based virtual list view search request maps to only one backend server;
computer usable program code for sending, in response to a determination that the offset-based virtual list view search request maps to only one backend server, the offset-based virtual list view search request to the only one backend server; and
computer usable program code for sending a sorted entry set as returned by the backend server to the client.

13. The computer program product of claim 12, further comprising:
computer usable program code for determining, in response to a determination that the offset-based virtual list view search request maps to more than one backend server, if the content count provided in the offset-based virtual list view search request by the client is not 0;
computer usable program code for sending, in response to a determination that the content count provided in the offset-based virtual list view search request by the client is not 0, a second offset-based virtual list view search request to the set of backend servers comprising before count=0, after count=0, offset=1, and content count=0;
computer usable program code for calculating, in response to receiving a content count from each backend server, a total content count comprising a summation of the content counts of all of the backend servers;
computer usable program code for determining an actual offset corresponding to the offset in the client request based on the total content count;
computer usable program code for determining, in response to determining the actual offset, before count entries and after count entries from the actual offset in the set of entries to form a complete entry set;
computer usable program code for creating a response control to send to the client; and
computer usable program code for sending the complete entry set and the response control to the client.

14. The computer program product of claim 10, wherein the top entries comprise a lowest sorted entry from each backend server in the set of backend servers.

15. The computer program product of claim 10, wherein the top entries comprise a highest sorted entry from each backend server in the set of backend servers.

16. The computer program product of claim 10, wherein the set of top entries are stored in an index array on the proxy server.

17. The computer program product of claim 10, wherein the computer usable program code for evaluating which of the backend servers has returned a top entry of the set of top entries comprises:
computer usable program code for sorting the set of top entries to determine the top entry in the set of top entries; and
computer usable program code for identifying the backend server which returned the top entry.

18. The computer program product of claim 10, wherein the response control comprises the target offset entry and a total content count of the complete entry set.

19. A data processing system for performing, by a proxy server, a virtual list view search in a distributed directory environment using a proxy server, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to send, in response to receiving an offset-based virtual list view search request from a client comprising sort keys, an offset, a before count, an after count, and a content count, a first search request based on the sort keys defined in the offset-based virtual list view search request to a set of backend servers for a set of top entries from each backend server; evaluate which of the backend servers has returned a top entry in the set of top entries; send a second search request to the backend server which had the top entry comprising a search filter for a requested entry having a sort order immediately below the top entry of a next one of the backend servers and a response control to return a number of entries starting from the top entry up to the requested entry to form an entry count; store the entry count incrementally as a calculated offset; return to the evaluating step until the calculated offset is greater than or equal to the offset sent in the offset-based virtual list view search request from the client; determine, in response to a determination that the calculated offset is greater than or equal to the offset sent the offset-based virtual list view search request from the client, that the backend server having a current top entry contains an entry corresponding to the offset sent in the offset-based virtual list view search request from the client; send a third search request to the backend server containing the current top entry to return a number of entries corresponding to the entry count having a sort order greater or equal to the sort value of the top entry to determine a target offset entry in the number of entries corresponding to the offset sent in the offset-based virtual list view search request from the client; create, in response to a determination that a complete entry set for the virtual list view search has been obtained, a response control to send to the client; and send the complete entry set and the response control to the client.

20. The computer implemented method of claim 1, further comprising:
receiving an assertion-based virtual list view search request comprising sort keys, an assertion value, a before count, and an after count from a client;
sending the assertion-based virtual list view search request to a set of backend servers in the distributed directory for a set of entries based on the sort keys;
receiving the set of entries and a first response control from each backend server in the set of backend servers;
sorting the set of entries returned by the set of backend servers;
locating an offset of a target entry in the set of entries based on the assertion value;
locating, based on the before count and the after count, a number of entries in the set of entries before the offset entry and a number of entries after the offset entry in the set of entries to form a result set;
creating a second response control to send to the client; and
sending the result set and the second response control to the client.

* * * * *